United States Patent [19]
Hunt et al.

[11] Patent Number: 6,070,734
[45] Date of Patent: Jun. 6, 2000

[54] ROTATION SHAFT WITH VIBRATION DAMPENING DEVICE

[75] Inventors: Jerry W. Hunt, Murray; Dennis M. Greenlee, Salt Lake City, both of Utah; Lyn Maurice Greenhill, Roseville, Calif.

[73] Assignee: Baker Hughes Incorporated, Houston, Tex.

[21] Appl. No.: 08/920,799

[22] Filed: Aug. 29, 1997

[51] Int. Cl.[7] .................................. B03D 1/16; B03D 1/18
[52] U.S. Cl. .................... 209/169; 210/219; 210/220; 210/221.1; 366/264; 74/573 F; 74/574; 261/93
[58] Field of Search .............................. 209/169; 210/219, 210/220, 221.1; 366/264; 74/573 F, 574; 261/93

[56] References Cited

U.S. PATENT DOCUMENTS 3,491,880   1/1970   Reck .
5,344,235   9/1994   Weetman .
5,356,569   10/1994  Von Berg .

FOREIGN PATENT DOCUMENTS 876174   10/1981   U.S.S.R. .

*Primary Examiner*—Thomas M. Lithgow
*Attorney, Agent, or Firm*—Henry D. Coleman; R. Neil Sudol

[57] ABSTRACT

Excessive vibration in industrial mixers such as flotation cells and draft tube mixers is attenuated by connecting a vibration dampening device to a rotor or impeller which is disposed in a mixing tank for pumping a nonhomogeneous fluidic material placed in the tank. In a draft tube mixer, where the rotor is connected to a drive shaft in turn connected to a motor for rotating the rotor, the vibration dampening device is connected to the shaft on a side of the rotor opposite the motor. In a froth flotation cell, if the rotor is hollow, the vibration dampening device is disposed inside a pipe in turn mounted inside the rotor along an axis thereof. The vibration dampening device takes the form of a tuned mass dampener tuned to a resonance frequency of the particular mixing apparatus.

30 Claims, 3 Drawing Sheets

ROTATION SHAFT WITH VIBRATION DAMPENING DEVICE

BACKGROUND OF THE INVENTION

This invention relates to reducing vibration in froth flotation cells wherein the source of the vibration is the rotor or mixer assembly.

Froth flotation cells are used to separate mineral values from mineral wastes. An ore is finely ground and suspended as a water-based slurry or pulp in a flotation cell. An impeller or rotor is turned at a high speed in the slurry to suspend the mineral particulates and distribute or disperse air bubbles into into the slurry. The mineral values attach to the air bubbles. The bubbles with the entrained mineral values then rise to form a froth atop the pulp or slurry pool. The froth overflows a weir and is collected in a launder for further processing. Examples of flotation cells are described in U.S. Pat. No. 5,611,917 to Degner, U.S. Pat. No. 4,737,272 to Szatkowski et al., U.S. Pat. No. 3,993,563 to Degner, U.S. Pat. No. 5,219,467 to Nyman et al., U.S. Pat. No. 5,251,764 to Niitti et al., and U.S. Pat. No. 5,039,400 to Kallioinen et al. In the flotation machines of some of these references, air is supplied to the pulp or slurry via a separate pumping mechanism.

During flotation cell operation, the rotation of the impeller can generate vibration in the flotation cell mechanism or drive assembly. Sometimes, these vibrations can become pronounced, thus dissipating the vibrational energy throughout the flotation cell superstructure or a portion thereof.

Significant vibration can also be generated in other types of industrial mixers such as draft tube mixers. Draft tube mixers generally comprise a propeller or rotor which pumps large volumes of sludges or slurries. In the anaerobic digestion of sewage sludges, these mixers act as low head, high volume sludge pumps. The mixing propellers are mounted for rotation about a vertical axis for mixing the nonhomogeneous components of the sewage sludge, thereby preventing stratification, enhancing thermal homogeneity, and for effecting surface agitation which breaks up surface scum.

SUMMARY OF THE INVENTION

The present invention is directed to solving the problem of excessive vibration in flotation cells and draft tube mixers. Generally, the invention contemplates the disposition of a vibration dampening device in a tank of an industrial mixing apparatus, the vibration dampening device being operatively connected to a rotor or impeller which is disposed in the tank for mixing a nonhomogeneous fluidic material placed in the tank More generally, the present invention contemplates the connection of a vibration dampening device to a rotation shaft which is disposed in a tank for imparting rotational energy to a fluidic material in the tank. The vibration dampening device attenuates vibrations generated in the shaft and transmitted to the tank from or over the shaft.

Where the shaft is connected to a mixing structure such as a rotor and to a motor, the vibration dampening device is connected to the rotor. In some designs, the vibration dampening device essentially becomes a part of the rotor. Where the shaft extends downwardly from a cover of the tank, the vibration dampening device may be either disposed below the rotor or made a part of the rotor. In draft tube mixers, a draft tube may be disposed about the vibration dampening device.

Pursuant to another feature of the present invention, the rotor may be hollow and the vibration dampening device is disposed inside the rotor. More specifically, the vibration dampening device is disposed inside a pipe in turn mounted to the rotor along an axis thereof. In this case, the vibration dampening device and the surrounding pipe are coaxial with a rotation shaft of the rotor. This arrangement of rotor and vibration dampening device is particularly useful in froth flotation cells.

According to another feature of the present invention, the vibration dampening device is a tuned mass dampener. Thus, the dampening device may be tuned to a resonance frequency to offset a natural frequency of the mechanism and cell structure. The tuned mass dampener may take different forms, for example, a spring-mounted mass, a magnetic mass disposed in a magnetic field, or a mass suspended at least partially in a viscous fluid. In the latter case, the mass of the weight, the depth of the fluid and the viscosity of the fluid may all be varied to tune the mass dampener so as to attenuate vibrations at a resonance frequency of the mixing apparatus.

The present invention is also directed to a mixing assembly utilizable, for example, in an anaerobic sludge mixing apparatus. The mixing assembly comprises a rotatable shaft connected to or carrying a mixing structure such as a propeller. A vibration dampening device is connected to the propeller or the shaft for attenuating vibrations arising by virtue of rotation of the shaft.

In a froth flotation cell, a rotation shaft is coupled to a rotor, and a vibration dampening device is connected to the rotor or the shaft. Where the rotor is hollow, comprising a plurality of longitudinally extending vanes equispaced about a rotation axis, the vibration dampening device may be disposed inside the rotor, coaxally therewith. In a particular embodiment of the invention, the vibration dampening device is disposed inside a pipe in turn mounted to the rotor along an axis thereof A method for assembling an industrial mixing apparatus comprises, in accordance with the present invention, providing a tank, a shaft and a vibration dampening device and further comprises rotatably mounting the shaft in the tank for imparting rotational energy to a fluidic material placed in the tank. The vibration dampening device is connected to the shaft, either directly or indirectly via a mixing structure such as a rotor connected to the shaft. The vibration dampening device attenuates vibrations generated in the mixing assembly by rotation of the rotor and by effects of hydraulic fluid flow.

In a retrofit situation, the vibration dampening device is connected at the factory to mixing structure such as a rotor, pump impeller, or propeller. The mixing assembly so constructed is shipped to a mixing site and replaces a mixing assembly in a pre-existing mixer, for example, a froth flotation cell or a draft tube mixer.

The rotatable mounting of a shaft in the tank generally includes installing a mixing structure such as a rotor, impeller or propeller. A motor is operatively connected to the shaft for rotating the mixing structure. The vibration dampening device is connected to the shaft either directly or indirectly via the mixing structure. In the latter case, the dampening device may be incorporated into the mixing structure as a part thereof In the latter case also, the dampening device may be connected to the rotor, impeller, or propeller on a side thereof opposite the drive shaft and the motor.

In a draft tube mixer, where the rotor includes helical propeller blades attached along the surface of a drive shaft, the dampening device is attached to a free end of the shaft below the propeller blades. A draft tube may be disposed about the vibration dampening device.

Generally, the tuning of a mass dampener is done at the dampener manufacturing facility, in accordance with specifications provided by a manufacturer of industrial mixers.

In a froth flotation cell having a hollow rotor, the mounting of the rotor in the tank includes connecting the rotor to a drive shaft so that the vibration dampening device is disposed inside the rotor and is coaxial with the drive shaft. However, the vibration dampening device could be positioned outside the rotor or built as part of the rotor.

The use of vibration dampening device in accordance with the present invention is particularly effective in attenuating vibration in industrial mixers. Operating efficiency is thereby increased. In addition, mixer life is lengthened.

DESCRIPTION OF THE PREFERRED EMBODIMENTS

Figure 1:
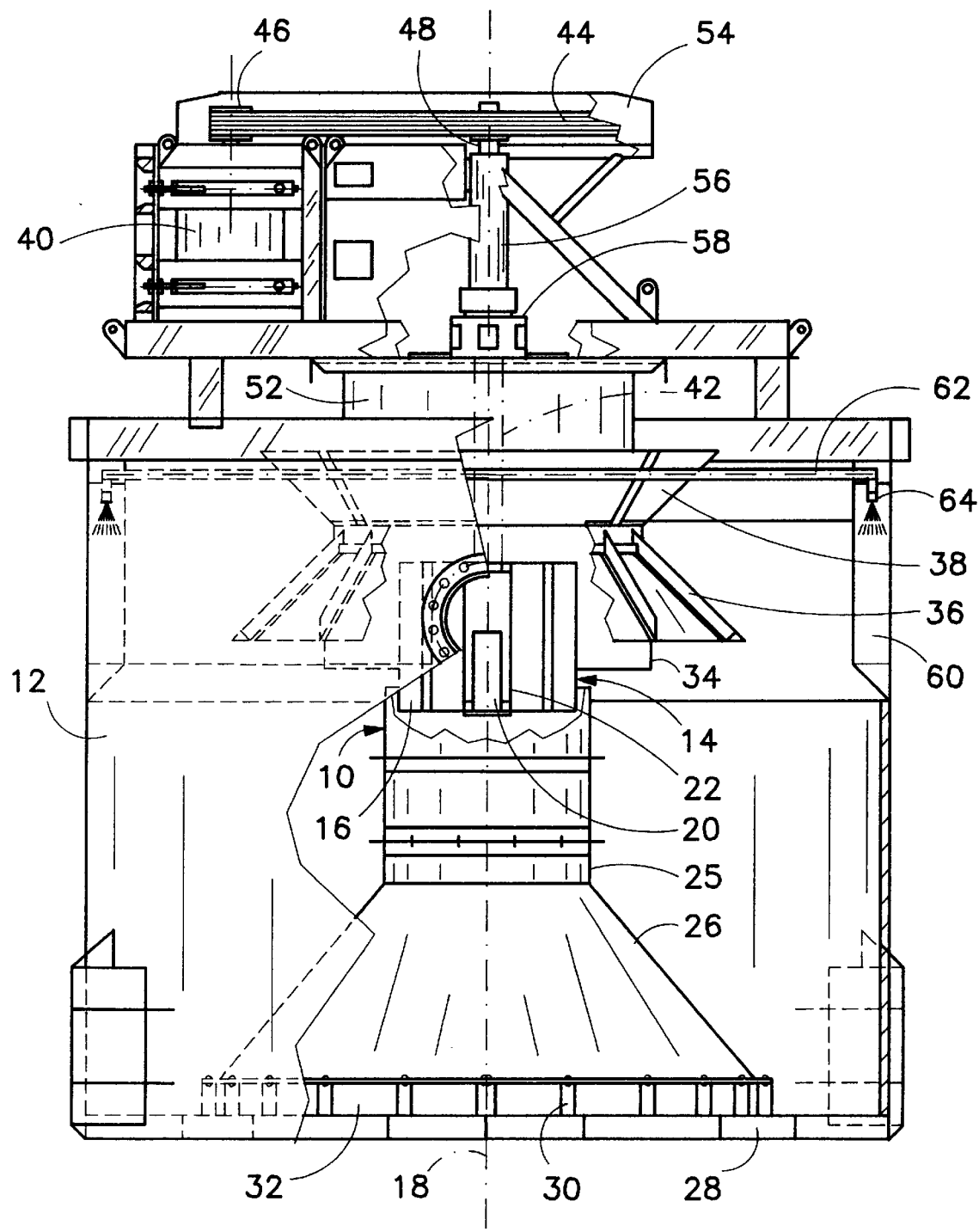
FIG. 1 is a side elevational view, partly broken away, of a froth flotation cell with a rotor or impeller assembly in accordance with the present invention.

As illustrated in FIG. 1, a froth flotation cell comprises a rotor assembly 10 rotatably disposed in a tank 12 for pumping a pulp phase or slurry together with air to thereby mix the air into the 2-phase pulp, generating a froth or bubble mass which floats atop a pulp mass or slurry pool in the tank. Rotor assembly 10 includes a mixing structure in the form of a rotor or impeller 14 comprising a plurality of vertical vanes or propeller blades 16 disposed in a cylindrical configuration about a rotation axis 18.

Figure 2:
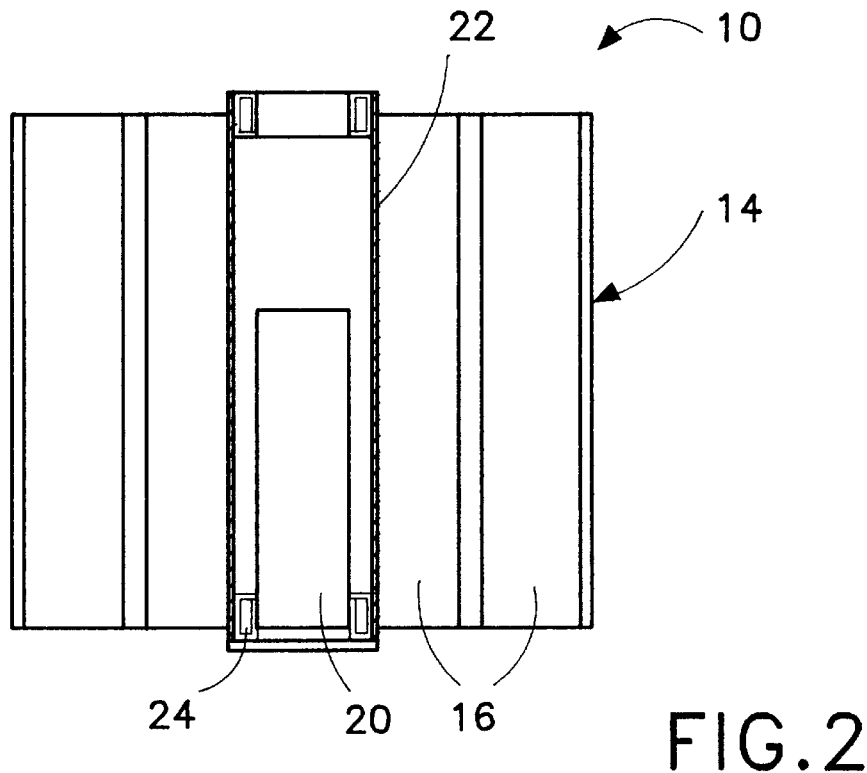
FIG. 2 is a longitudinal cross-sectional view of the rotor assembly shown in FIG. 1.

As illustrated in FIGS. 1 and 2, rotor assembly 10 further includes a vibration dampening device 20 for attenuating the transmission of vibrations to tank 10 and concomitantly attenuating resonant vibrational energy in the superstructure of the flotation cell. Dampening device 20 is disposed coaxially within a pipe 22 and connected thereto by means of a plurality of fasteners 24. Pipe 22 is in turn mounted coaxially inside impeller 14.

The froth flotation cell of FIG. 1 further comprises conventional components as described below.

A lower end of impeller 14 is juxtaposed to an upper end of a cylindrical draft tube extension or spacer element 25 which is coupled at a lower end to a conical draft tube 26. Draft tube 26 is spaced from a lower wall or panel 28 of tank 12 by a plurality of supports 30. Supports 30 define a plurality of openings 32 through which pulp or slurry moves is drawn into extension 26.

An upper end of impeller 14 is surrounded by a fenestrated disperser 34 which is coaxial with impeller 14 and acts to facilitate shearing of air bubbles and to reduce the energy after mixing of air and pulp. Positioned over and about disperser 34 is a perforated conical hood 36 for stabilizing the pulp surface. Impeller 14 is positioned near the top of the fluid volume and hood 36 functions to calm the turbulent fluid.

A crowder device 38 is provided above hood 36 and impeller 14. Crowder device 38 is coaxial with impeller 14, dampening device 20, pipe 22, disperser 34, and hood 36. The structure and function of crowder device 38 is described in U.S. Pat. No. 5,611,917 to Degner, the disclosure of which is hereby incorporated by reference. The disclosures of U.S. Pat. No. 4,737,272 to Szatkowski et al. and U.S. Pat. No. 3,993,563 to Degner are also incorporated by reference.

Impeller 14 is operatively connected to a motor 40 via a drive shaft 42, transmission belts 44 and sheaves 46 and 48. Motor 40 is supported on tank 12 via a mechanism stand 50 and a base plate and standpipe 52, while transmission belts 44 and sheaves 46 and 48 are covered by a belt guard 54. A bearing housing 56 surrounds drive shaft 42 along an upper portion thereof, a slide gate air control 58 being disposed at the lower end of bearing housing 56.

Flotation cell tank 12 is provided along an upper end thereof with a froth overflow weir or launder 60 which receives froth and channels it away from the flotation cell. A galvanized pipe 62 and nozzle element 64 are provided for spray washing froth in launder 60.

Figure 3:
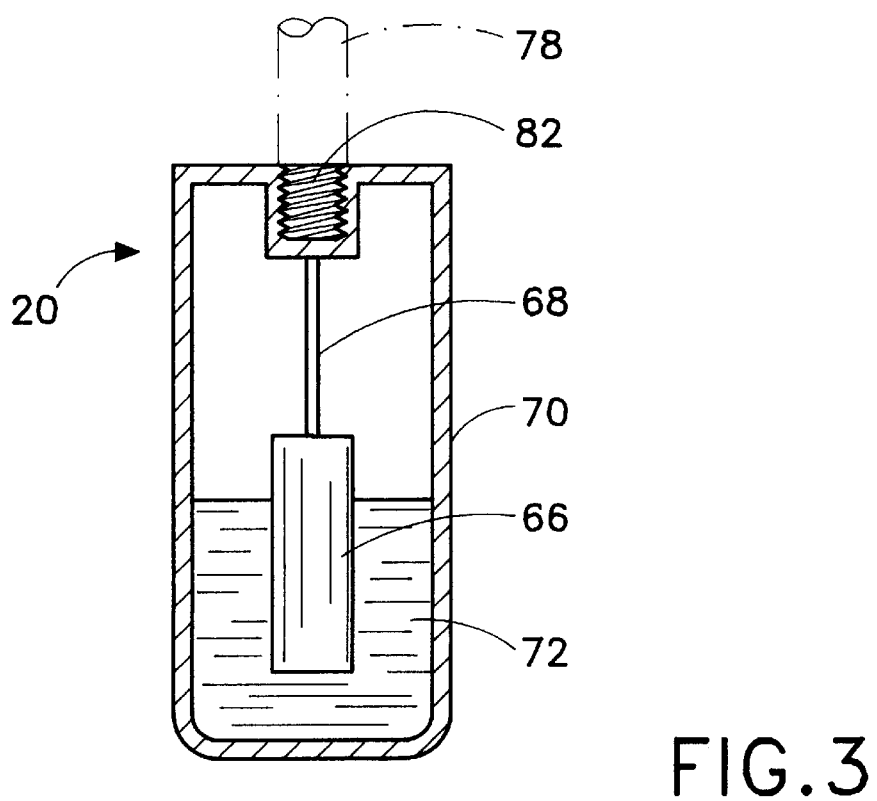
FIG. 3 is a schematic longitudinal cross-sectional view of a tuned mass dampener utilizable with the rotor assembly of FIGS. 1 and 2.

Preferably, vibration dampening device 20 is a tuned mass dampener. As diagrammatically depicted in FIG. 3, a pendulum-type embodiment of dampening device 20 includes a mass or weight 66 suspended via a rod 68 in a housing 70. A pool of damping liquid 72 is provided in housing 70 so that weight 66 is at least partially disposed in the liquid. Dampening device 20 is tuned to a natural resonance frequency which is selected for a particular froth flotation cell or mixing apparatus and which is different from the natural resonance frequency of the particular froth flotation cell or mixing apparatus. The mass of weight 66, the depth of liquid 72 and the viscosity of the liquid may all be selected to offset a natural resonance frequency of the respective mixing apparatus. The selecting of these variables affect the mass ratio (fraction of mass 66 relative to vibrating mass), tuning frequency (natural frequency of the tuned mass dampener relative to a natural resonance frequency of the mixing assembly or apparatus), and damping ratio (percent of critical dampening). A tuned mass dampener as illustrated in FIG. 3 can be obtained from CSA Engineering, Inc., of Palo Alto, Calif., USA.

The connection of vibration dampening device 20 to impeller 14 substantially attenuates, if not effectively eliminates, excessive vibration in the froth flotation cell of FIG. 1. Excessive vibration may be attenuated or eliminated in other kinds of industrial mixers such as draft tube mixers by using rotor assemblies including dampening devices.

Figure 4:
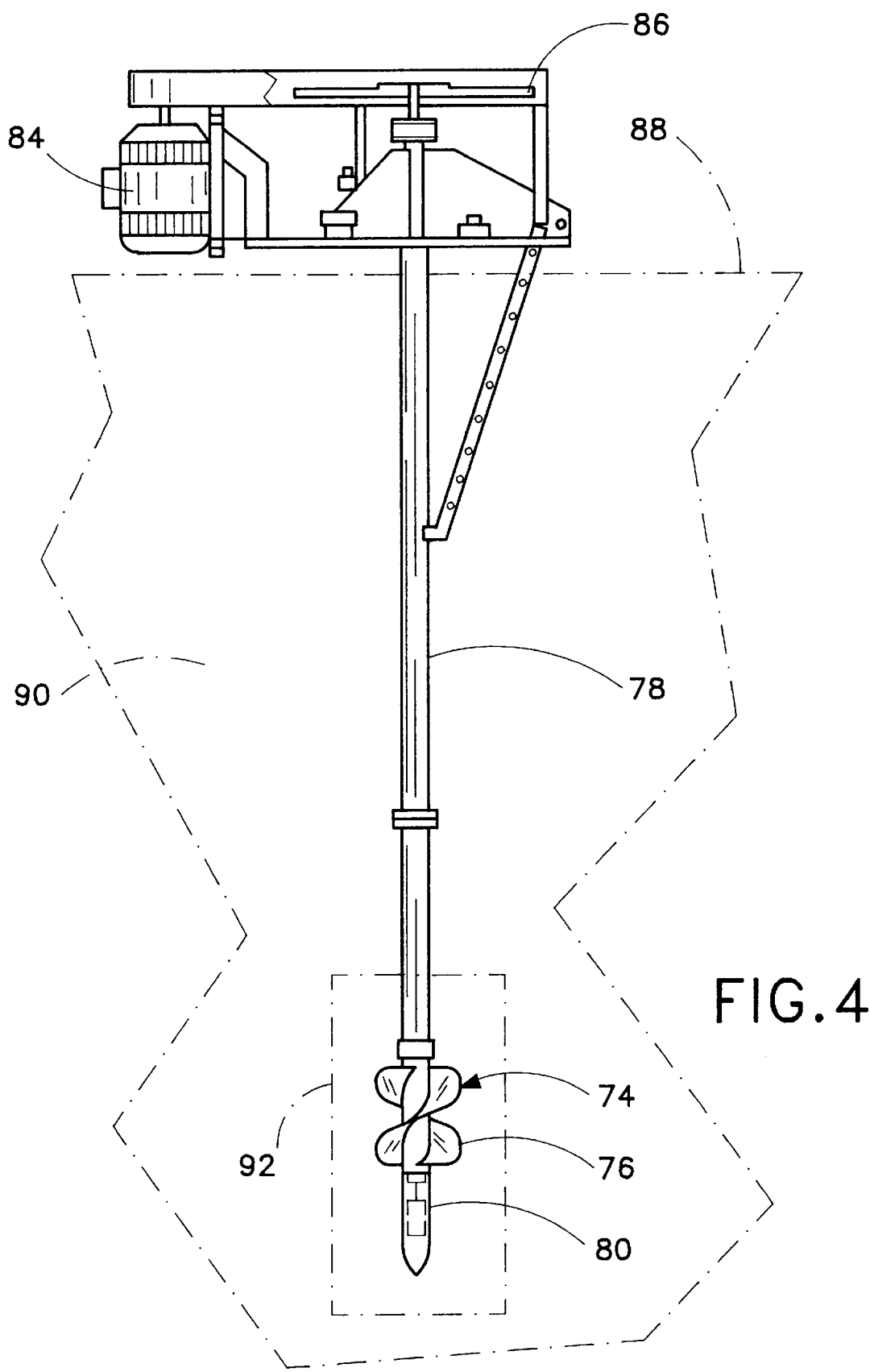
FIG. 4 is a side elevational view of a propeller assembly of a draft tube mixer, in accordance with the present invention.

As illustrated in FIG. 4, a rotor assembly of a draft tube mixer comprises a pump impeller 74 which includes a plurality of helical propeller blades 76 attached to a drive shaft 78. On a side of impeller 74 opposite the driving side thereof is a vibration dampening device 80. Dampening device 80 may take the form illustrated in FIG. 3. Dampener housing 70 is provided at an upper end with a threaded recess 82 for coupling to an end of shaft 78.

At an upper end, drive shaft 78 is coupled to a motor 84 via transmission belts 86. Vibration dampening device 80 is connected to shaft 78 on a side of impeller 74 opposite motor 84. Shaft 78 depends downwardly from a cover 88 of a mixing tank 90, so that vibration dampening device 80 is disposed below impeller 74. A draft tube 92 is disposed about impeller 74 and vibration dampening device 80.

The use and disposition of the rotor assembly of FIG. 4 in a mixing apparatus, as well as the operation and function of the mixing apparatus is described in U.S. Pat. No. 4,647,215 to Armitage et al., the disclosure of which is hereby incorporated by reference herein.

Although the invention has been described in terms of particular embodiments and applications, one of ordinary skill in the art, in light of this teaching, can generate additional embodiments and modifications without departing from the spirit of or exceeding the scope of the claimed invention. For example, vibration dampening devices other than tuned mass dampeners may be used in accordance with the present invention. Such alternative tuned mass dampeners may be magnetic or spring-loaded rather than hydraulic. Tuning, however, is particularly beneficial for optimizing results where there are many different mixer sizes and specifications.

It is to be noted also that the present invention is generally beneficial wherever a rotating shaft may give rise to vibrations at natural resonant frequencies of the shaft assembly or of other structures to which the shaft assembly is connected.

Accordingly, it is to be understood that the drawings and descriptions herein are offered by way of example to facilitate comprehension of the invention and should not be construed to limit the scope thereof.

What is claimed is:

1. A mixing apparatus, comprising:
   a tank;
   a shaft rotatably disposed in said tank for imparting rotational energy to a fluidic material placed in said tank, said shaft, together with structure including said tank and the fluidic material placed in said tank, having a natural frequency of vibration; and
   a vibration dampening device tuned to a resonance frequency to offset said natural frequency, said vibration dampening device being operatively connected to said shaft for attenuating vibrations at said natural frequency during rotation of said shaft.

2. The apparatus defined in claim 1 wherein said shaft is a drive shaft operatively coupled to a fluid mixing structure, a motor being operatively connected to said shaft, said vibration dampening device being connected to said shaft on a side of said mixing structure opposite said motor.

3. The apparatus defined in claim 2 wherein said shaft depends downwardly from a cover of said tank, said vibration dampening device being disposed as part of said mixing structure.

4. The apparatus defined in claim 3 wherein a draft tube is disposed about said vibration dampening device.

5. The apparatus defined in claim 3 wherein said vibration dampening device is a tuned mass dampener.

6. The apparatus defined in claim 2 wherein said mixing structure is taken from the group consisting of rotors, impellers, propellers, and mixers.

7. The apparatus defined in claim 1 wherein said vibration dampening device is a tuned mass dampener.

8. The apparatus defined in claim 1 wherein said shaft is coupled to a hollow rotor, said vibration dampening device being disposed inside said rotor.

9. The apparatus defined in claim 8 wherein said vibration dampening device is disposed inside a pipe in turn mounted to said rotor along an axis thereof.

10. The apparatus defined in claim 9 wherein the apparatus is a froth flotation cell.

11. The apparatus defined in claim 9 wherein said vibration dampening device is a tuned mass dampener.

12. The apparatus defined in claim 1 wherein the apparatus is a froth flotation cell.

13. An assembly for a mixing apparatus, comprising:
    a rotation shaft with a fluid mixing structure connected thereto; and
    a vibration dampening device operatively connected to said shaft proximate to a side of said fluid mixing structure opposite a driven side of said shaft for attenuating vibrations arising by virtue of rotation of said shaft and said fluid mixing structure, said vibration dampening device including a mass mounted at least indirectly to said shaft so as to permit substantial motion of said mass relative to said shaft.

14. The assembly defined in claim 13 wherein said shaft includes a hollow extension, said vibration dampening device being disposed inside said hollow extension.

15. The assembly defined in claim 14 wherein said extension is a rotor, said vibration dampening device being disposed inside a pipe in turn mounted to said rotor along an axis thereof.

16. The assembly defined in claim 15 wherein the assembly is adapted for use in a froth flotation cell.

17. The assembly defined in claim 16 wherein said vibration dampening device is a tuned mass dampener tuned to said froth flotation cell.

18. The assembly defined in claim 13 wherein said fluid mixing structure includes impeller blades connected to said shaft.

19. The assembly defined in claim 13 wherein said vibration dampening device is a tuned mass dampener.

20. The assembly defined in claim 13 wherein said vibration dampening device is tuned to a particular mixing apparatus.

21. The assembly defined in claim 13 wherein said fluid mixing structure is taken from the group consisting of rotors, impellers, propellers, and mixers.

22. A method for assembling a mixing apparatus, comprising:
    providing a tank, a motor and a shaft with a fluid mixing structure connected thereto;
    rotatably mounting said shaft together with said fluid mixing structure in said tank for imparting rotational energy to a fluidic material placed in said tank, the mounting of said shaft in said tank including operatively connecting said shaft to said motor;
    selecting a vibration dampening device to have a tuned or set resonance frequency to offset a natural frequency of vibration of said shaft, said fluid mixing structure, and said fluidic material during rotation of said shaft and said fluid mixing structure; and
    operatively connecting said vibration dampening device to said shaft proximate to a side of said fluid mixing structure opposite said motor for attenuating vibrations arising by virtue of rotation of said shaft and said fluid mixing structure.

23. The assembly defined in claim 22 wherein said mixing structure is taken from the group consisting of rotors, impellers, propellers, and mixers.

24. The method defined in claim 22 wherein said shaft depends downwardly from a cover of said tank, the mounting of said shaft in said tank including disposing said vibration dampening device below said mixing structure.

25. The method defined in claim 24, further comprising disposing a draft tube about said vibration dampening device.

26. The method defined in claim 25 wherein said vibration dampening device is a tuned mass dampener tuned to the mixing apparatus.

27. The method defined in claims 22 wherein said shaft includes a hollow extension and the mounting of said shaft in said tank includes disposing said vibration dampening device inside said extension coaxially with said shaft.

28. The assembly defined in claim 13 wherein vibration dampening device further includes a motion dampening element disposed in operative engagement with said mass.

29. The assembly defined in claim 28 wherein said motion dampening element includes a fluid.

30. The assembly defined in claim 29 wherein design parameters of said vibration dampening device, including the weight of said mass and the viscosity of said fluid, are selected to tune said vibration dampening device to a resonance frequency to offset a natural frequency of vibration of said shaft and said mixing structure.

* * * * *

UNITED STATES PATENT AND TRADEMARK OFFICE
CERTIFICATE OF CORRECTION

PATENT NO. : 6,070,734
DATED : June 6, 2000
INVENTOR(S) : Jerry W. Hunt et al

It is certified that error appears in the above-indentified patent and that said Letters Patent is hereby corrected as shown below:

Column 2, line 31, change "coaxally" to --coaxially --.

Signed and Sealed this

Third Day of April, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,070,734
DATED : June 6, 2000
INVENTOR(S) : Jerry W. Hunt et al.

It is certified that error appears in the above-identified patent and that said Letters Patent is hereby corrected as shown below:

Column 2,
Line 31, change "coaxally" to -- coaxially --.

Signed and Sealed this

Thirteenth Day of November, 2001

Attest:

*Nicholas P. Godici*

NICHOLAS P. GODICI
*Attesting Officer*     *Acting Director of the United States Patent and Trademark Office*